(12) United States Patent
Tachibana et al.

(10) Patent No.: US 12,204,714 B2
(45) Date of Patent: Jan. 21, 2025

(54) OPERATION DETECTION SENSOR AND ELECTRONIC APPARATUS

(71) Applicant: Murata Manufacturing Co., Ltd., Nagaokakyo (JP)

(72) Inventors: Yuuki Tachibana, Nagaokakyo (JP); Hiroaki Kitada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 4 days.

(21) Appl. No.: 17/929,838

(22) Filed: Sep. 6, 2022

(65) Prior Publication Data
US 2022/0413648 A1 Dec. 29, 2022

Related U.S. Application Data

(63) Continuation of application No. PCT/JP2021/028759, filed on Aug. 3, 2021.

(30) Foreign Application Priority Data

Aug. 7, 2020 (JP) .................................. 2020-134737

(51) Int. Cl.
*G06F 3/041* (2006.01)
(52) U.S. Cl.
CPC ........ *G06F 3/0414* (2013.01); *G06F 3/04162* (2019.05)
(58) Field of Classification Search
CPC .. G06F 3/0414; G06F 3/04162; G06F 3/0383; G06F 2203/04105; G06F 3/03545; G01L 1/16
See application file for complete search history.

(56) References Cited

U.S. PATENT DOCUMENTS

| 7,342,575 | B1 | 3/2008 | Hartwell et al. |
| 8,040,142 | B1 * | 10/2011 | Bokma ................ H03K 17/955 |
| | | | 324/658 |
| 9,357,493 | B1 * | 5/2016 | Butler ................. G06F 3/03545 |

(Continued)

FOREIGN PATENT DOCUMENTS

| JP | 2013257658 A | 12/2013 |
| JP | 2015170331 A | 9/2015 |

(Continued)

OTHER PUBLICATIONS

International Search Report in PCT/JP2021/028759, mailed Oct. 19, 2021, 3 pages.

*Primary Examiner* — Jose R Soto Lopez
(74) *Attorney, Agent, or Firm* — ArentFox Schiff LLP

(57) ABSTRACT

An operation detection sensor is provided and an electronic apparatus is provided that detect an operation on an operation target regardless of a waveform state of an output voltage of a sensor. The operation detection sensor includes a piezoelectric element, a voltage detection circuit that detects a voltage generated in the piezoelectric element, and a calculation unit that obtains a reference voltage by averaging detection voltages of the voltage detection circuit, and detects an operation on an operation target when a state in which a voltage difference between the reference voltage and the detection voltage is a predetermined value or more continues for a predetermined time or more.

21 Claims, 14 Drawing Sheets

(56) References Cited

U.S. PATENT DOCUMENTS

| | | | |
|---|---|---|---|
| 2010/0258361 A1* | 10/2010 | Yamauchi | G06F 3/044 |
| | | | 178/18.06 |
| 2015/0205566 A1* | 7/2015 | Osterhout | G04G 21/025 |
| | | | 345/2.1 |
| 2017/0052626 A1* | 2/2017 | Chen | G06F 3/041661 |
| 2017/0176268 A1 | 6/2017 | Kihara et al. | |
| 2019/0220105 A1 | 7/2019 | Noma | |
| 2020/0033204 A1 | 1/2020 | Isono et al. | |
| 2020/0042137 A1* | 2/2020 | Kano | H10N 30/88 |

FOREIGN PATENT DOCUMENTS

| | | |
|---|---|---|
| JP | 6265272 B2 | 1/2018 |
| JP | 2019125858 A | 7/2019 |
| JP | 6566182 B1 | 8/2019 |
| WO | 2015053248 A1 | 4/2015 |

\* cited by examiner

OPERATION DETECTION SENSOR AND ELECTRONIC APPARATUS

CROSS REFERENCE TO RELATED APPLICATIONS

This application is a continuation of PCT Application No. PCT/JP2021/028759, filed Aug. 3, 2021, which claims priority to Japanese Patent Application No. 2020-134737, filed Aug. 7, 2020, the entire contents of each of which are hereby incorporated by reference in their entirety.

TECHNICAL FIELD

The present invention relates to an operation detection sensor and an electronic apparatus that detect an operation on an operation target.

BACKGROUND

Japanese Patent No. 6265272 (hereinafter "Patent Document 1") describes a configuration that determines whether or not a piezoelectric sensor output value exceeds a threshold, and determines that a housing is held when the piezoelectric sensor output value exceeds the threshold.

Japanese Patent No. 6566182 (hereinafter "Patent Document 2") describes a configuration that includes a piezoelectric sensor that outputs a voltage corresponding to a deformation amount of a receiving unit that receives a pressing operation, and determines whether or not the receiving unit is in a state of receiving the pressing operation on the basis of an integrated value obtained by integrating the voltage.

In operation, both the configurations of Patent Documents 1 and 2 detect a difference from a reference voltage. However, in order to determine the reference voltage, the waveform of the output voltage of the sensor needs to be stable. Therefore, the reference voltage cannot be determined until the output value of the sensor is stabilized. In addition, for the determination of the integral value as in Patent Document 2, since a calculation error is accumulated, it is necessary to periodically reset the reference voltage. For the resetting of the reference voltage, the waveform of the output voltage of the sensor needs to be stable.

SUMMARY OF THE INVENTION

In view of the above, exemplary embodiments of the present invention provide an operation detection sensor and an electronic apparatus that detect an operation on an operation target regardless of a waveform state of an output voltage of the sensor.

In an exemplary aspect, an operation detection sensor is provided that includes a piezoelectric element; a voltage detection circuit configured to detect a voltage generated in the piezoelectric element; and a calculation unit configured to obtain a reference voltage by averaging detection voltages of the voltage detection circuit, and to detect an operation on an operation target when a state in which a voltage difference between the reference voltage and the detection voltage is a predetermined value or more continues for a predetermined time or more.

In this manner, the calculation unit is configured to detect the operation on the operation target when the difference from the reference voltage continues for a predetermined time or more instead of the value of the detection voltage itself. Therefore, when the waveform of the output voltage of the sensor is unstable, the calculation unit is still configured to appropriately detect whether or not the operation has been performed.

According to exemplary embodiments of the present invention, an operation on an operation target can be detected regardless of a waveform state of an output voltage of a sensor.

DETAILED DESCRIPTION

Hereinafter, an operation detection sensor 1 according to an exemplary embodiment and an electronic apparatus 100 including the operation detection sensor 1 will be described with reference to the drawings. In each drawing, wiring details and the like are omitted for convenience of description and those such details would be understood to one skilled in the art.

Figure 1:
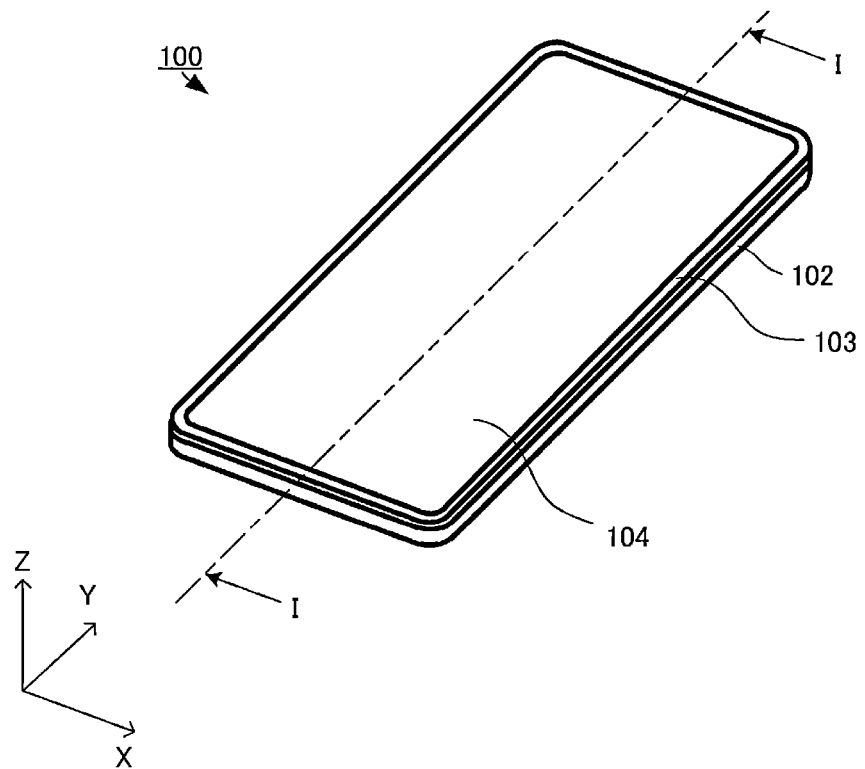
FIG. 1 is a perspective view of an electronic apparatus 100 including an operation detection sensor 1.

FIG. 1 is a perspective view of the electronic apparatus 100 including the operation detection sensor 1. The electronic apparatus 100 is an information processing device, such as a smartphone or the like.

Figure 2:
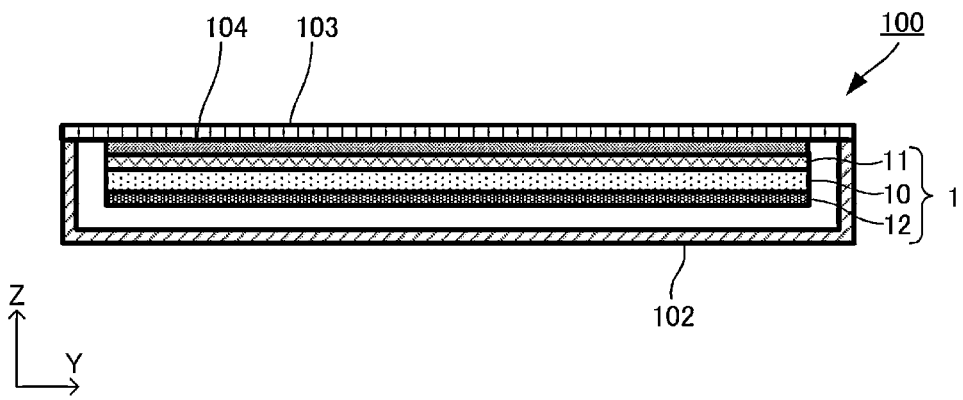
FIG. 2 is a schematic sectional view of the electronic apparatus 100.

FIG. 2 is a schematic sectional view taken along line I-I illustrated in FIG. 1. Note that, in FIG. 2, the operation detection sensor 1 is described in a large size for convenience of description, and other electronic components and the like are omitted.

As illustrated in FIG. 1, the electronic apparatus 100 includes housing 102 having a substantially rectangular parallelepiped shape. The electronic apparatus 100 includes a flat surface panel 103 arranged in housing 102. The surface panel 103 is configured to function as an operation surface on which a user performs a touch operation using a finger, a pen, or the like. Hereinafter, a width direction (e.g., a horizontal direction) of the housing 102 is assumed to be an X direction, a length direction (e.g., a vertical direction) is assumed to be a Y direction, and a thickness direction is assumed to be a Z direction.

As illustrated in FIG. 2, the electronic apparatus 100 includes a display 104 and an operation detection sensor 1 inside a housing 102. The display 104 and the operation detection sensor 1 are formed on an inner surface of the housing 102 of the surface panel 103. Moreover, the surface panel 103 has translucency.

The lower surface of the surface panel 103 and the upper surface of the display 104 are attached with, for example, a gluing agent or an adhesive. In addition, the lower surface of the display 104 and the upper surface of the operation detection sensor 1 are attached with, for example, a gluing agent or an adhesive.

In a case where the operation detection sensor 1 is transparent, the operation detection sensor 1 may be arranged closer to the surface panel 103 than the display 104 in an exemplary aspect.

When a user presses the surface panel 103, the surface panel 103 is bent in the Z direction. The operation detection sensor 1 is deformed according to the deflection of the surface panel 103.

The operation detection sensor 1 includes a piezoelectric element 10, a first electrode 11, and a second electrode 12. The piezoelectric element 10 is formed in a rectangular shape in a plan view. The first electrode 11 and the second electrode 12 each have a flat film shape, and are formed in a rectangular shape in the plan view similarly to the piezoelectric element 10. However, it is noted that the shape of each of the piezoelectric element 10, the first electrode 11, and the second electrode 12 is not limited to a rectangular shape.

The piezoelectric element 10 is made of, for example, a chiral polymer such as polyvinylidene fluoride (PVDF), polylactic acid, or the like. As the polylactic acid (PLA), either poly-L-lactic acid (PLLA) or poly-D-lactic acid (PDLA) may be used. The piezoelectric element 10 is polarized by expansion and contraction in a planar direction, and generates a potential difference between the first principal surface and the second principal surface.

According to an exemplary aspect, the first electrode 11 is a ground electrode, and the second electrode 12 is an electrode for detection. The first electrode 11 is also configured to function as a noise shield for the display 104. However, the second electrode 12 may be a ground electrode.

Figure 3:
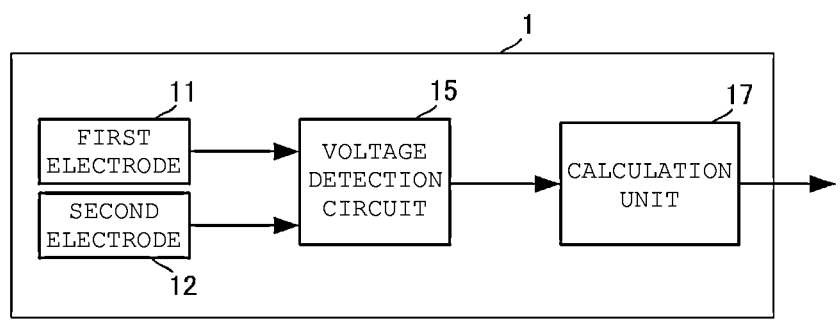
FIG. 3 is a block diagram illustrating an electrical configuration of the operation detection sensor 1.

FIG. 3 is a block diagram illustrating an electrical configuration of the operation detection sensor 1. The first electrode 11 and the second electrode 12 are connected to the voltage detection circuit 15. The voltage detection circuit 15 detects a potential difference between the first electrode 11 and the second electrode 12, that is, a voltage generated in the piezoelectric element 10. The voltage detection circuit 15 the is configured to output a detection voltage to the calculation unit 17.

The calculation unit 17 is configured to detect whether or not a pressing operation has been performed on the surface panel 103, which is an operation target, based on the detection voltage detected by the voltage detection circuit 15.

Figure 4:
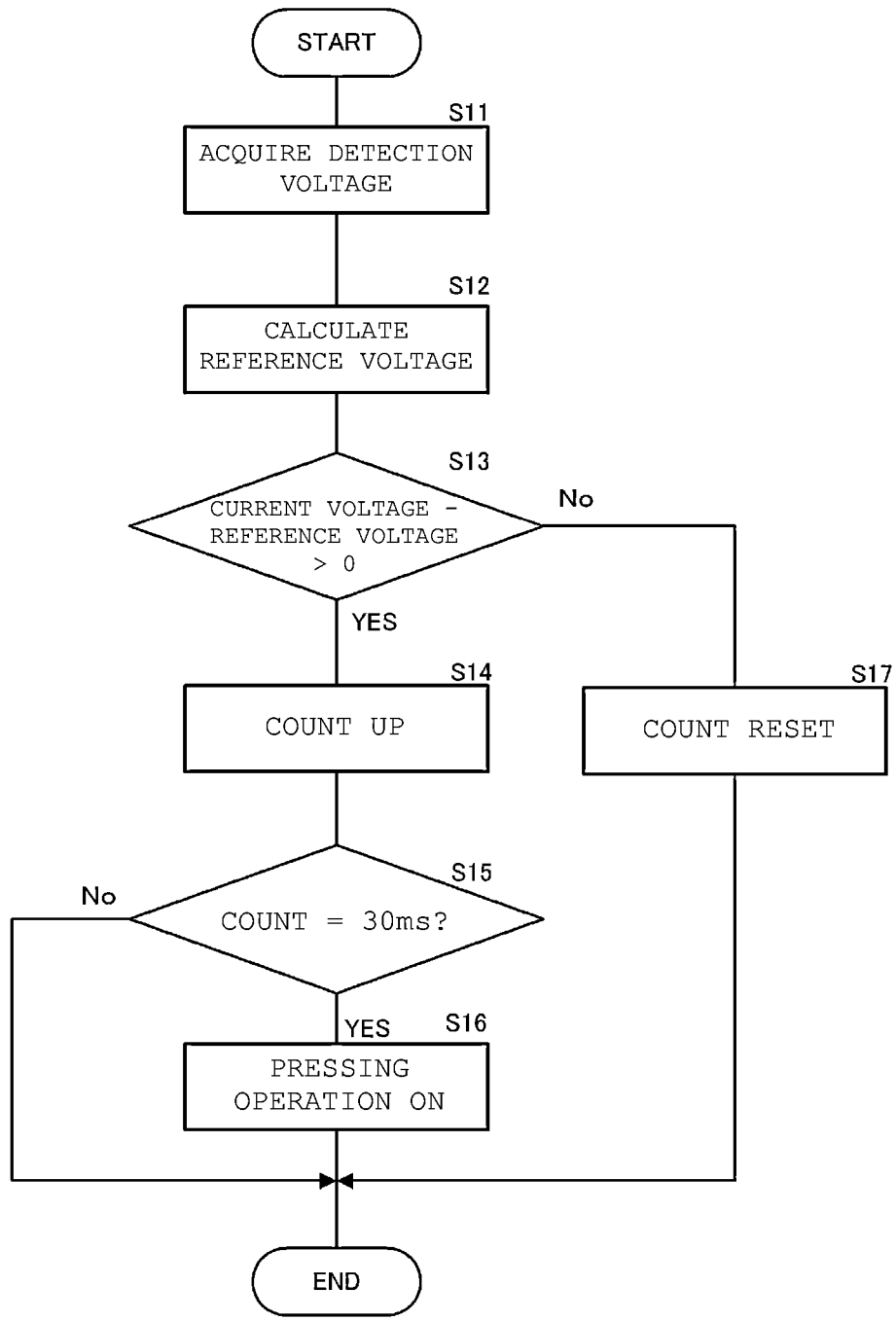
FIG. 4 is a flowchart illustrating an operation of a calculation unit 17.
Figure 5:
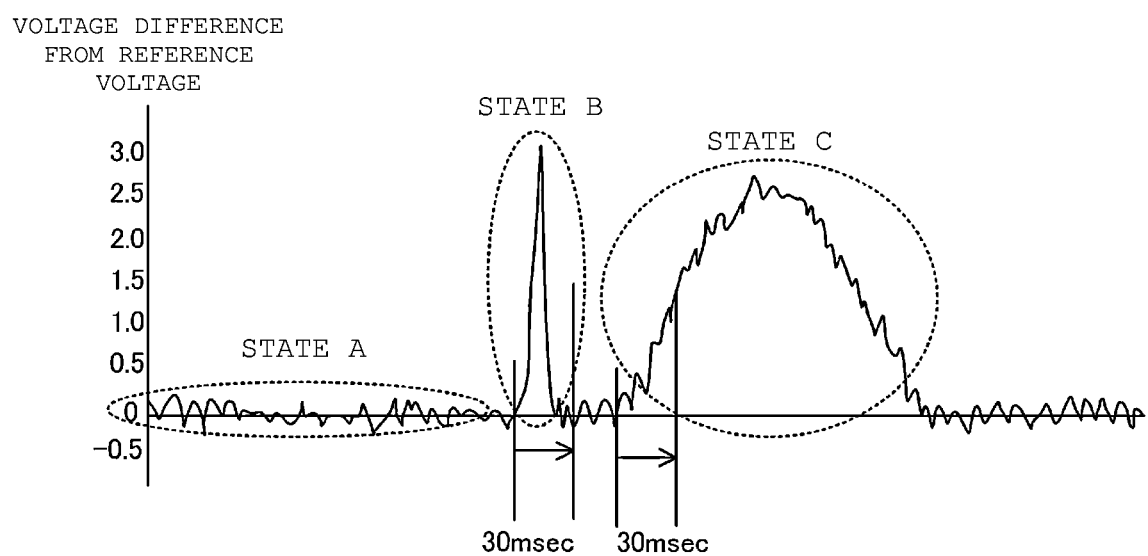
FIG. 5 is a diagram illustrating a voltage difference from a reference voltage.

FIG. 4 is a flowchart illustrating an operation of the calculation unit 17, and FIG. 5 is a diagram illustrating a time waveform of a voltage difference between a detection voltage and a reference voltage. In an exemplary aspect, the calculation unit 17 is configured to perform the operation illustrated in FIG. 4 a predetermined time period (for example, every 1 msec). The vertical axis in FIG. 5 represents the value of a voltage difference between a detection voltage and a reference voltage, and it is noted that the value of the reference voltage is not necessarily 0V.

The calculation unit 17 acquires a detection voltage (S11). At this time, the calculation unit 17 may perform low-pass filter (LPF) processing of about several tens Hz to several hundreds Hz to remove a noise component.

Next, the calculation unit 17 averages the detection voltages to calculate a reference voltage (S12). The reference voltage is obtained by, for example, a moving average of the detection voltages. For example, the calculation unit 17 sets the average of the detection voltages of the past 1000 samples as the reference voltage. In other words, the calculation unit 17 sets the average value of the detection voltages in the past 1 second as the reference voltage.

Next, the calculation unit 17 determines whether or not the voltage difference between the current detection voltage and the reference voltage is greater than a predetermined value (0 in this example), that is, whether the current detection voltage is greater than the reference voltage (S13). When the user performs a pressing operation on the surface panel 103, the operation detection sensor 1 bends, and a positive voltage is generated in the second electrode 12. The voltage is proportional to the deformation speed of the operation detection sensor 1. Therefore, when the user performs the pressing operation on the surface panel 103, the current detection voltage becomes greater than the reference voltage.

When the calculation unit 17 determines that the current detection voltage is greater than the reference voltage, the calculation unit 17 counts up the determination count (S14). For example, the calculation unit 17 counts up 1 msec in order to perform the operation illustrated in FIG. 5 every 1 msec. Then, the calculation unit 17 determines whether or not the determination count has reached a predetermined time (30 msec in this example) (S15). In a case where the determination count has reached the predetermined time of 30 msec, the calculation unit 17 determines that the pressing operation has been performed (S16). On the other hand, when the calculation unit 17 determines that the current detection voltage is equal to or lower than the reference voltage in the determination of S13, the calculation unit 17 resets the determination count (S17).

By the above processing, the calculation unit 17 detects the operation on the operation target when the difference from the reference voltage continues for a predetermined time or more instead of the value of the detection voltage itself. As illustrated in FIG. 5, in a case where the pressing operation is not performed, if the detection voltage is unstable due to noise or the like as in a state A, the current detection voltage does not become greater than the reference voltage for a predetermined time or more. Therefore, the calculation unit 17 does not erroneously determine that the pressing operation has been performed due to noise. In addition, when a high detection voltage is detected due to, for example, an unintended impact or the like as in a state B, the current detection voltage does not become greater than the reference voltage for a predetermined time or more. Therefore, the calculation unit 17 does not erroneously determine that the pressing operation has been performed due to an unintended impact or the like.

On the other hand, when the user intentionally performs the pressing operation on the surface panel 103 as in a state C, a positive voltage is continuously generated slowly and for a long time in comparison with an impact or the like. Therefore, when the user intentionally performs the pressing operation on the surface panel 103, the current detection voltage becomes greater than the reference voltage continuously for a predetermined time or more. Therefore, the calculation unit 17 can correctly detect only the intentional pressing operation of the user when then pressing operation has occurred for more the predetermined time or greater.

Since the operation detection sensor 1 of the present embodiment does not use the value of the detection voltage itself as a reference for determination, the operation detection sensor 1 can accurately detect the pressing operation when the detection voltage is unstable, and the reference voltage fluctuates. Thus, the operation detection sensor 1 can detect an operation on the operation target regardless of the waveform state of the output voltage of the sensor. In addition, the operation detection sensor 1 can perform the determination without it depending on an individual difference in sensitivity of the sensor. Furthermore, the operation detection sensor 1 of the present embodiment can perform the determination without it depending on a sensitivity difference between sensors when sensors are used for the same device.

As also described above, the surface panel 103, the display 104, and the operation detection sensor 1 are attached with an adhesive or a gluing agent. The adhesive or the gluing agent produces a stress-relieving action that is to restore the original shape from the deformed shape. The stress-relieving action generates a voltage having a polarity opposite to the voltage against deformation. The stress-relieving action continues after the deformation disappears. Therefore, if the determination is performed based on the integral value of the detection voltage deformation, the stress-relieving action affects the determination result. However, since the operation detection sensor 1 of the present embodiment does not use the integral value, the determination can be performed without depending on the stress-relieving action.

In addition, since the operation detection sensor 1 of the present embodiment calculates the reference voltage by averaging the detection voltages, the reference voltage can be easily obtained regardless of whether or not the detection voltage is stable. Therefore, it is unnecessary for the operation detection sensor 1 to perform calibration at the time of activation or during operation of the sensor.

It should be appreciated that the predetermined time is not limited to 30 msec. The predetermined time can be appropriately set according to the type, sensitivity, and the like of the housing or the sensor of the electronic apparatus to be used. Moreover, the pressing operation can be appropriately detected by the predetermined time in the range of 10 msec to 150 msec.

Note that, in the above example, the pressing operation is detected when the current detection voltage is continuously greater than the reference voltage for the predetermined time or more. However, in an alternative aspect, the pressing operation may be detected when the current detection voltage is lower than the reference voltage. Moreover, the operation on the operation target is not limited to the pressing operation. The operation detection sensor 1 may detect, for example, a bending operation, a twisting operation, or the like on the housing 102 of the electronic apparatus 100.

Figure 6:
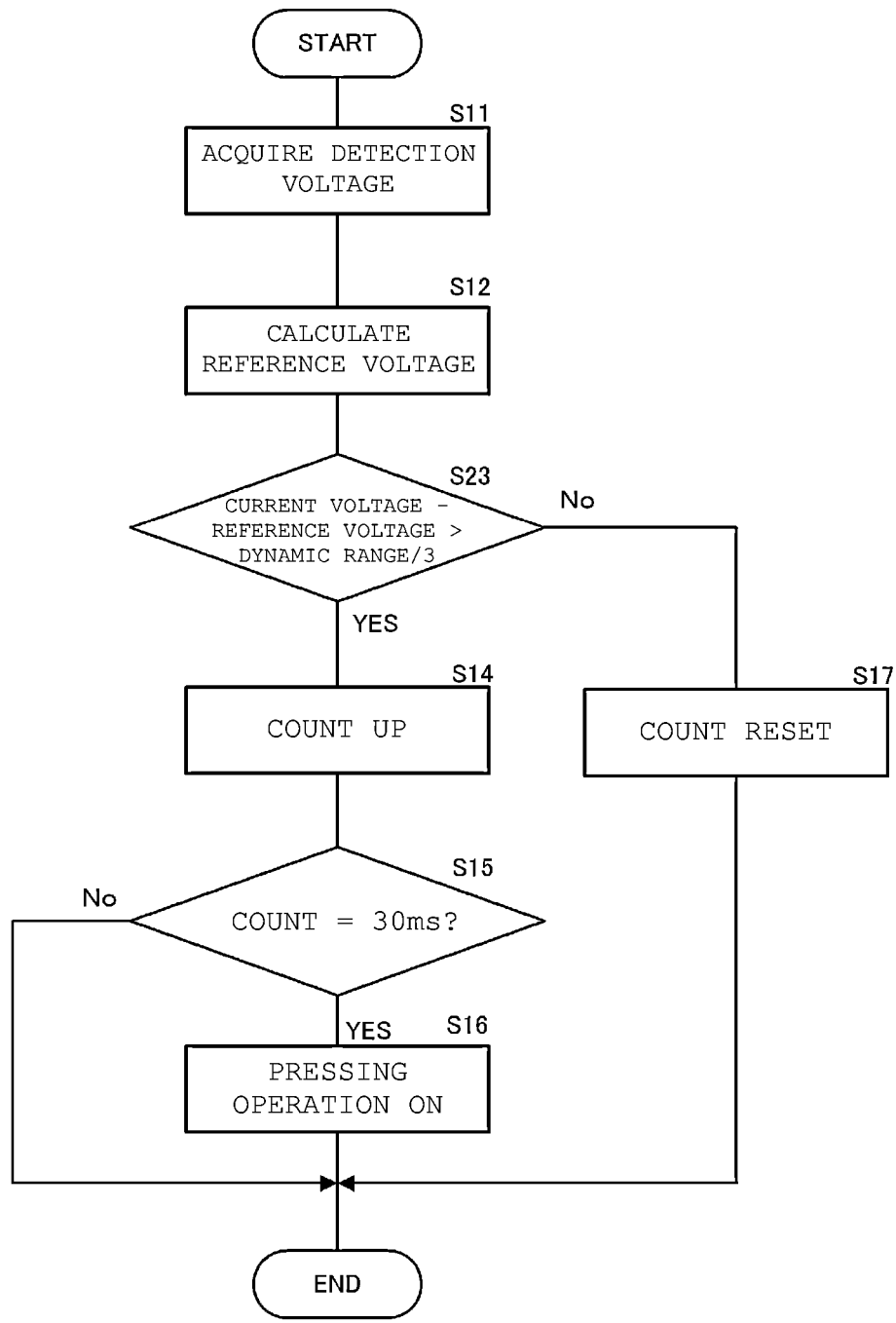
FIG. 6 is a flowchart illustrating an operation of the calculation unit 17 according to a first modification.
Figure 7:
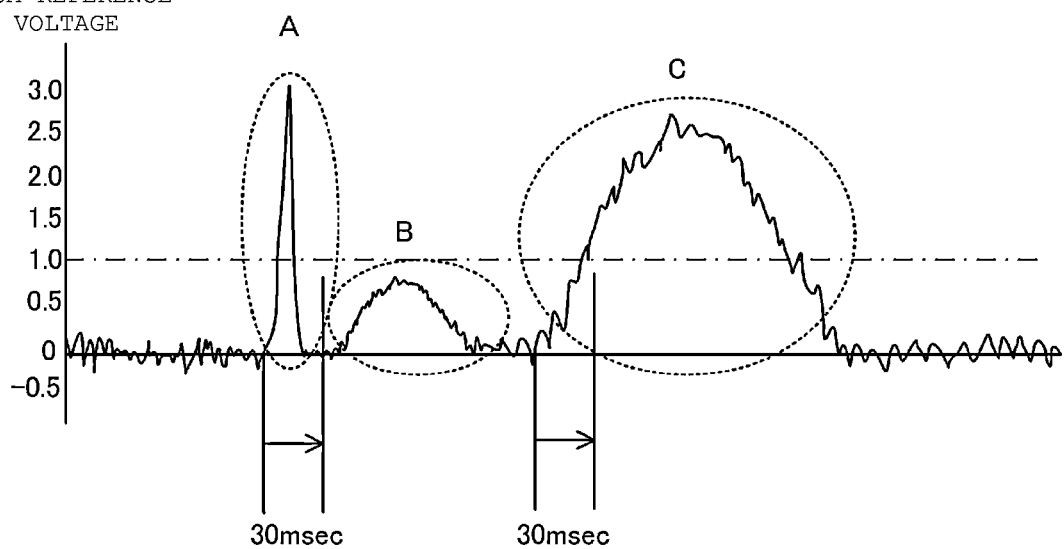
FIG. 7 is a diagram illustrating a time waveform of a voltage difference between a detection voltage and a reference voltage according to the first modification.

Next, FIG. 6 is a flowchart illustrating an operation of the calculation unit 17 according to a first modification, and FIG. 7 is a diagram illustrating a time waveform of a voltage difference between the detection voltage and the reference voltage according to the first modification. Note that, in FIG. 6, processes common to those in FIG. 4 are denoted by the same reference numerals, and description thereof is omitted.

In this example, the calculation unit 17 determines whether or not the voltage difference between the current detection voltage and the reference voltage is greater than a predetermined value (e.g., ⅓ of the dynamic range in this example) (S23). The dynamic range is a maximum value of a voltage that can be detected. Other processing is the same as the flowchart of FIG. 6. In this example, the predetermined value is not set to 0, but is set to a positive voltage value to some extent. That is, a dead zone is set to the voltage difference between the current detection voltage and the reference voltage.

The housing 102 of the electronic apparatus 100 is provided with an operation target such as switches. The operation detection sensor 1 also deforms when an operation is performed on another operation target. Therefore, as illustrated in the state B of FIG. 7, the detection voltage also increases when an operation on another operation target is performed. However, in the first modification, the dead zone is set in the voltage difference between the current detection voltage and the reference voltage. Therefore, the calculation unit 17 according to the first modification does not erroneously determine that the pressing operation has been performed when an operation on another operation target is performed as in the state B.

In the example of FIG. 6, the dead zone is set to ⅓ of the dynamic range, but it is not limited to ⅓ of the dynamic range. The dead zone is appropriately set according to the configuration of another operation target or the like. Moreover, the pressing operation can be appropriately detected with the dead zone in a range of 1/40 or more of the dynamic range.

Figure 8:
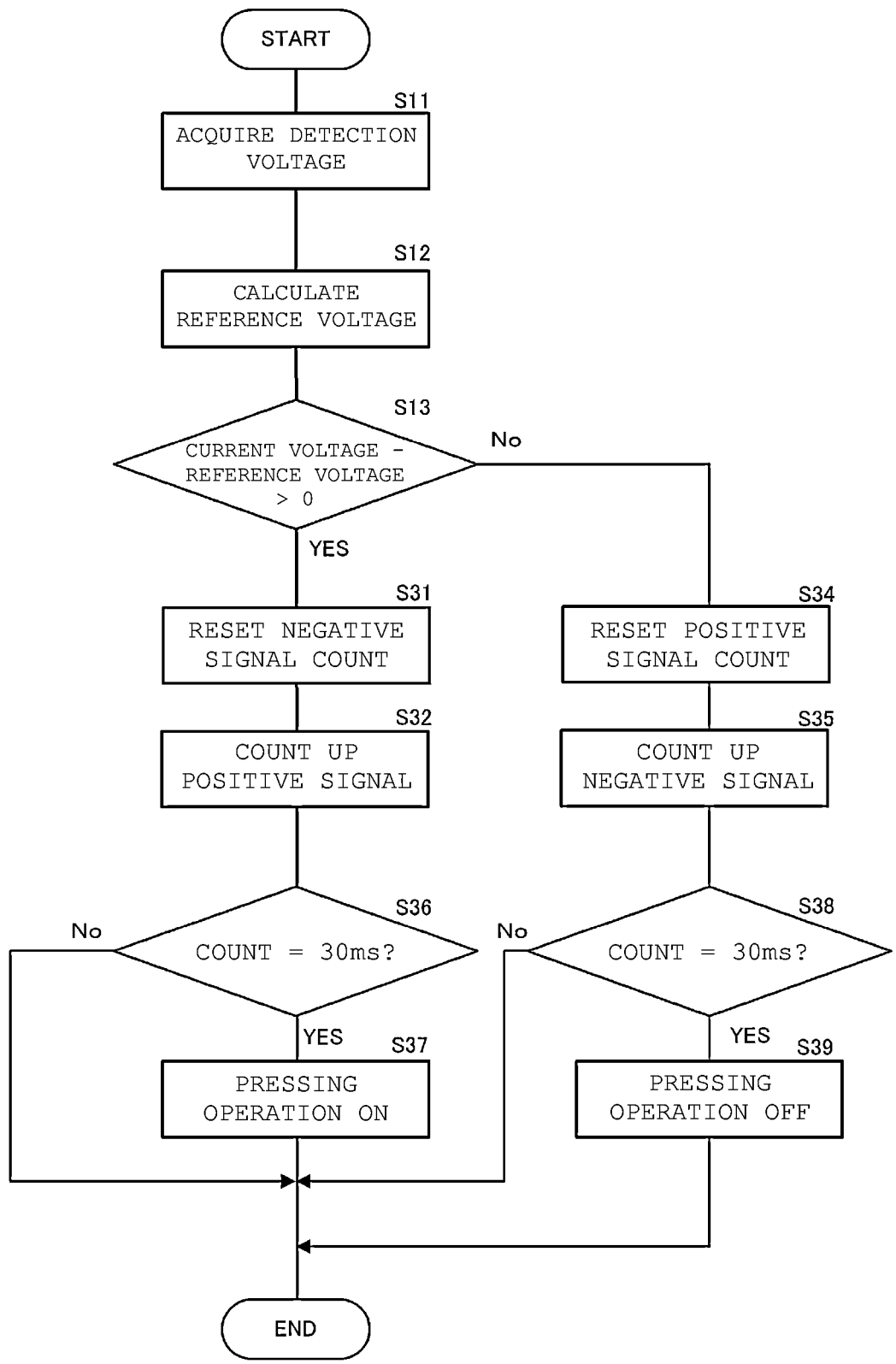
FIG. 8 is a flowchart illustrating an operation of the calculation unit 17 according to a second modification.
Figure 9:
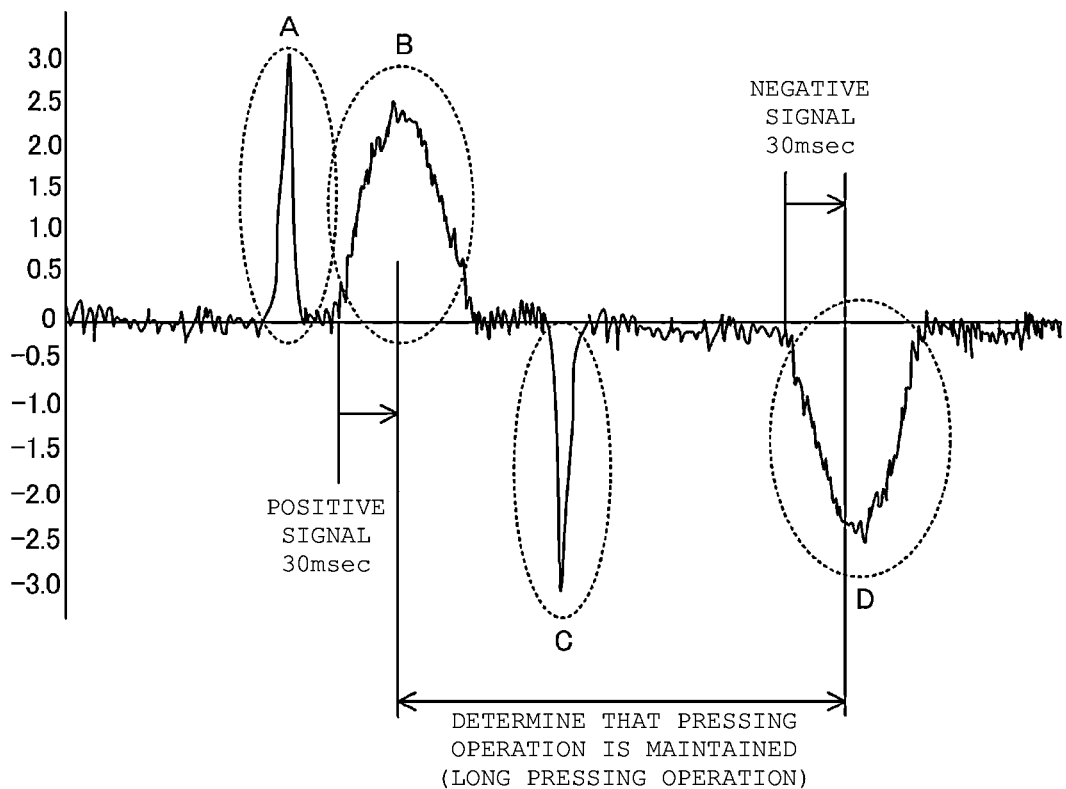
FIG. 9 is a diagram illustrating a time waveform of a voltage difference between a detection voltage and a reference voltage according to the second modification.

Next, FIG. 8 is a flowchart illustrating an operation of the calculation unit 17 according to a second modification, and FIG. 9 is a diagram illustrating a time waveform of a voltage difference between the detection voltage and the reference voltage according to the second modification. Note that, in FIG. 8, processes common to those in FIG. 4 are denoted by the same reference numerals, and description thereof is omitted.

When the calculation unit 17 according to the second modification determines that the current detection voltage is greater than the reference voltage in S13, the calculation unit 17 resets the determination count of the negative signal (S31) and counts up the determination count of the positive signal (S32). When the calculation unit 17 determines that the current detection voltage is equal to or lower than the reference voltage in S13, the calculation unit 17 resets the determination count of the positive signal (S34), and counts up the determination count of the negative signal (S35). In S13, it can be determined whether the current detection voltage is equal to or greater than the reference voltage, or is lower than the reference voltage.

Then, after the processing of S32, the calculation unit 17 determines whether the positive signal determination count has reached a predetermined time (e.g., 30 msec in this example) (S36). When the positive signal determination count has reached the predetermined time of 30 msec, the calculation unit 17 determines that the pressing operation has been performed (S37). On the other hand, after the processing of S35, the calculation unit 17 determines whether the negative signal determination count has reached a predetermined time (e.g., 30 msec in this example) (S38). When the negative signal determination count has reached 30 msec, the calculation unit 17 determines that the pressing operation has been released (S39).

As described above, the detection voltage is proportional to the deformation speed of the operation detection sensor 1. Therefore, as illustrated in the state B of FIG. 9, when the user performs the pressing operation on the surface panel 103, the current detection voltage becomes greater than the reference voltage. However, when the pressing operation continues with the same pressing force, the detection voltage gradually decreases, and the difference from the reference voltage decreases. Then, when the pressing operation is released as illustrated in the state D of FIG. 9, the current detection voltage becomes lower than the reference voltage. Thereafter, when the deformation of the surface panel 103 returns to the original state, the detection voltage gradually increases, and the difference from the reference voltage decreases.

Therefore, the calculation unit 17 according to the second modification is configured to maintain the detection state of the pressing operation until a state in which the current detection voltage is lower than the reference voltage continues for a predetermined time or more after a state in which the current detection voltage is greater than the reference voltage continues for a predetermined time or more. Accordingly, a long pressing operation on the surface panel 103 by the user is detected.

It is also noted that the calculation unit 17 of the second modification does not erroneously determine that the pressing operation has been performed when a positively large detection voltage is detected due to an unintended impact or the like as in the state A, for example. Similarly, the calculation unit 17 does not erroneously determine that the pressing operation is released when a negatively large detection voltage is detected due to an unintended impact or the like as in the state C, for example.

Figure 10:
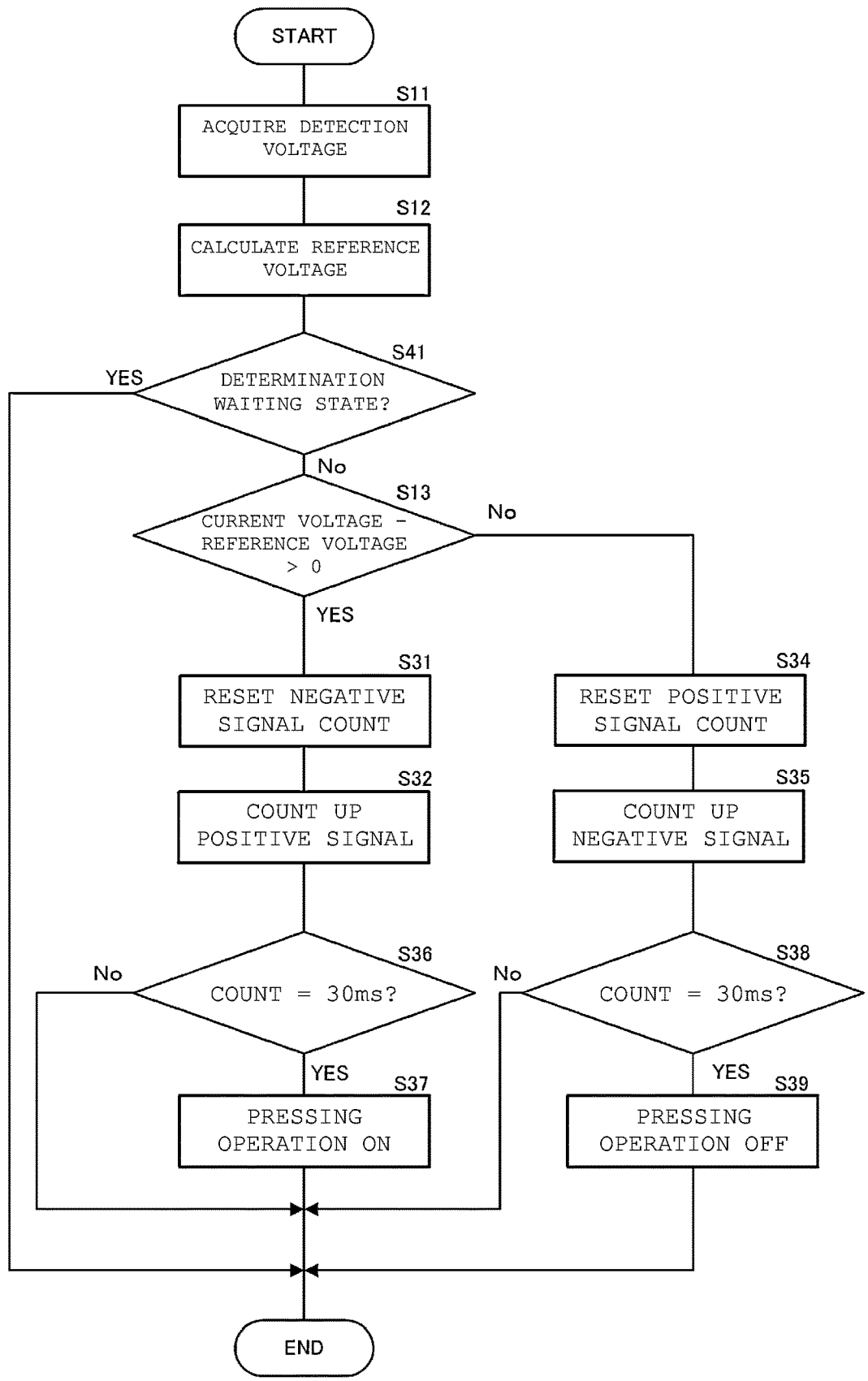
FIG. 10 is a flowchart illustrating an operation of the calculation unit 17 according to a third modification.
Figure 11:
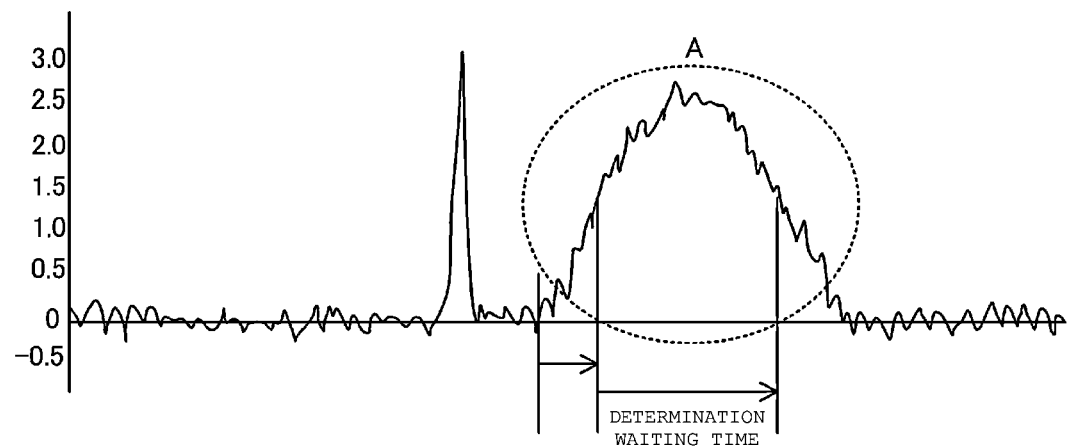
FIG. 11 is a diagram illustrating a time waveform of a voltage difference between a detection voltage and a reference voltage according to the third modification.

Next, FIG. 10 is a flowchart illustrating an operation of the calculation unit 17 according to a third modification, and FIG. 11 is a diagram illustrating a time waveform of a voltage difference between the detection voltage and the reference voltage according to the third modification. Note that, in FIG. 10, processes common to those in FIG. 8 are denoted by the same reference numerals, and description thereof is omitted.

After the calculation unit 17 according to the third modification calculates the reference voltage in S12, the calculation unit 17 determines whether or not it is in the determination waiting state (S41). The determination waiting state is a state of waiting for a predetermined determination waiting time after detecting the pressing operation (or after detecting release of the pressing operation) as illustrated in the state A of FIG. 11. In the determination waiting state, the calculation unit 17 does not compare the voltage with the reference voltage, and passes until the next determination timing (e.g., after passage of 1 msec).

Since the reference voltage is a value obtained by averaging the detection voltages, the reference voltage gradually changes to a high value when the user performs the pressing operation. When the reference voltage becomes high, the detection voltage is likely to be lower than the reference voltage. As described above, the stress-relieving action generates a voltage having a polarity opposite to the voltage against deformation. Therefore, immediately after the pressing operation is performed, a state in which the detection voltage is lower than the reference voltage may continue for a predetermined time (for example, 30 msec) or more due to the stress-relieving action. Then, the calculation unit 17 of the third modification does not perform comparison with the reference voltage as a determination waiting state after detecting the pressing operation, and passes until the next determination timing (e.g., after elapse of 1 msec). This configuration prevents erroneous determination due to the stress-relieving action. The same applies after the pressing operation is released.

It should be appreciated that the description of the present embodiment is to be considered in all respects as illustrative and not restrictive.

For example, the calculation unit 17 detects the pressing operation when the state in which the detection voltage is greater than the reference voltage continues for a predetermined time or more, and detects the release of the pressing operation when the state in which the detection voltage is lower than the reference voltage continues for a predetermined time or more.

However, as described above, the operation on the operation target may include, for example, a bending operation. While performing an operation of pressing the surface panel 103, the user cannot perform an operation of pulling the surface panel 103 (e.g., a deformation operation in a direction opposite to the pressing). However, the bending operation can perform bending along the first direction and bending along the second direction opposite to the first direction. Therefore, the calculation unit 17 can be configured to detect the bending operation along the first direction when the state in which the detection voltage is greater than the reference voltage continues for a predetermined time or more, and can be configured to detect the bending operation along the second direction when the state in which the detection voltage is lower than the reference voltage continues for a predetermined time or more.

In addition, the calculation unit 17 can be configured to detect an operation of a case where an operation along the second direction is detected after detecting the bending operation along the first direction and an operation of a case where an operation along the second direction is first detected from a state where no operation is detected as different operations. That is, the calculation unit 17 detects a first operation when a state in which the detection voltage is initially greater than the reference voltage continues for a predetermined time or more from a state in which no operation is detected, and detects a second operation when a state in which the detection voltage is initially lower than the reference voltage continues for a predetermined time or more from a state in which no operation is detected. The calculation unit 17 can also be configured to detect a third operation when the state in which the detection voltage is lower than the reference voltage continues for the predetermined time or more after the state in which the detection voltage is greater than the reference voltage continues for the predetermined time or more, and can be configured to detect a fourth operation when the state in which the detection voltage is greater than the reference voltage continues for the predetermined time or more after the state in which the detection voltage is lower than the reference voltage continues for the predetermined time or more.

Figure 12:
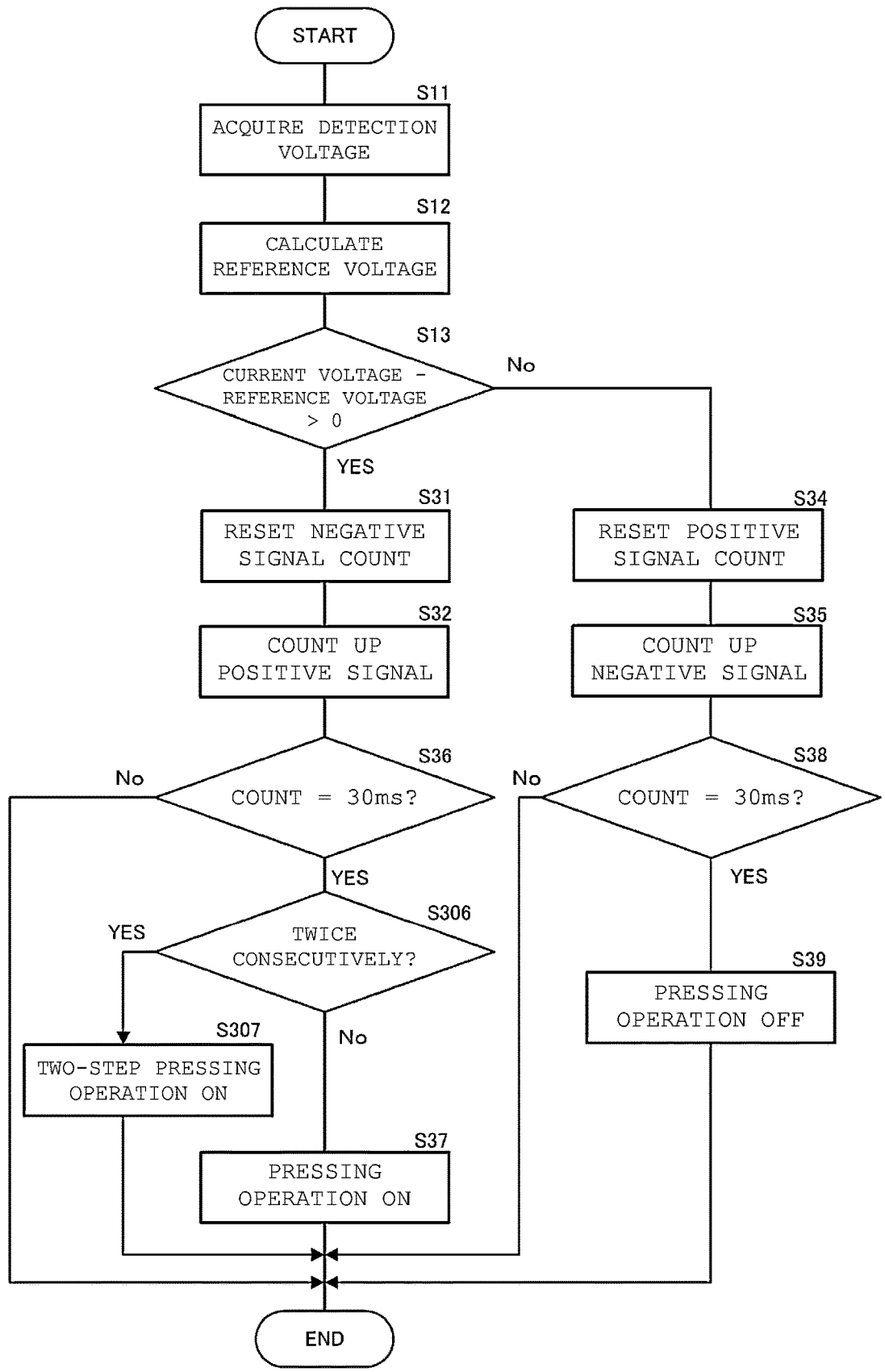
FIG. 12 is a flowchart illustrating an operation of the calculation unit 17 according to a fourth modification.
Figure 13A:
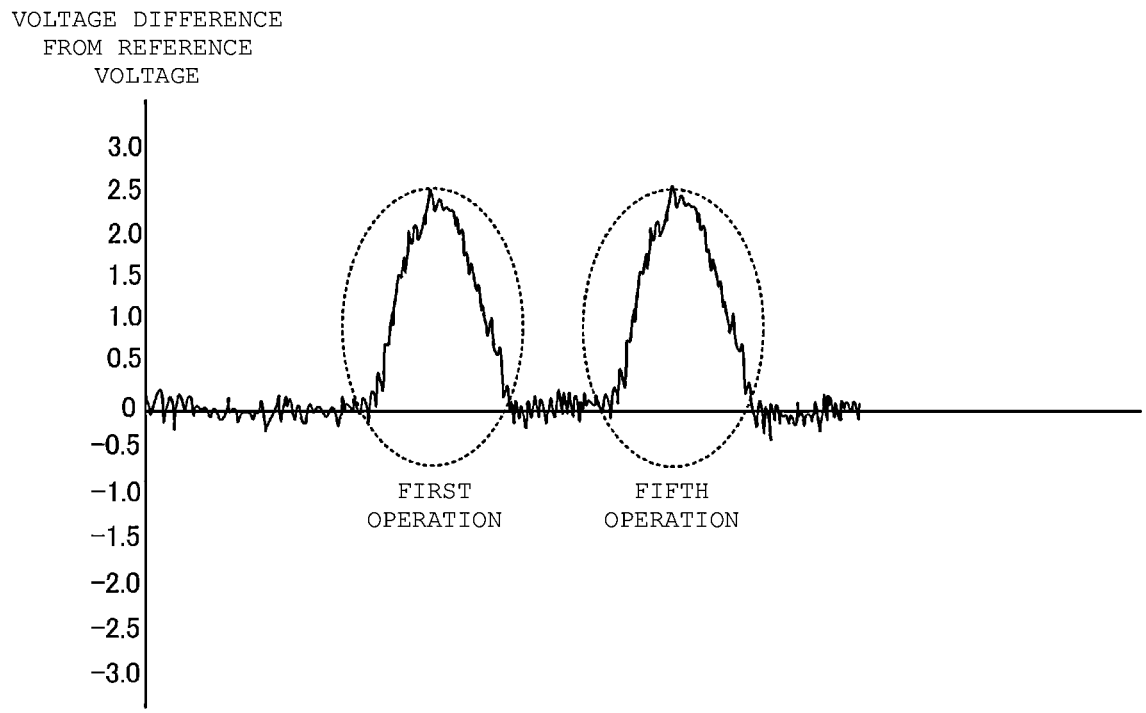
FIGS. 13(A) and 13(B) are diagrams each illustrating a time waveform of a voltage difference between a detection voltage and a reference voltage according to the fourth modification.
Figure 13B:
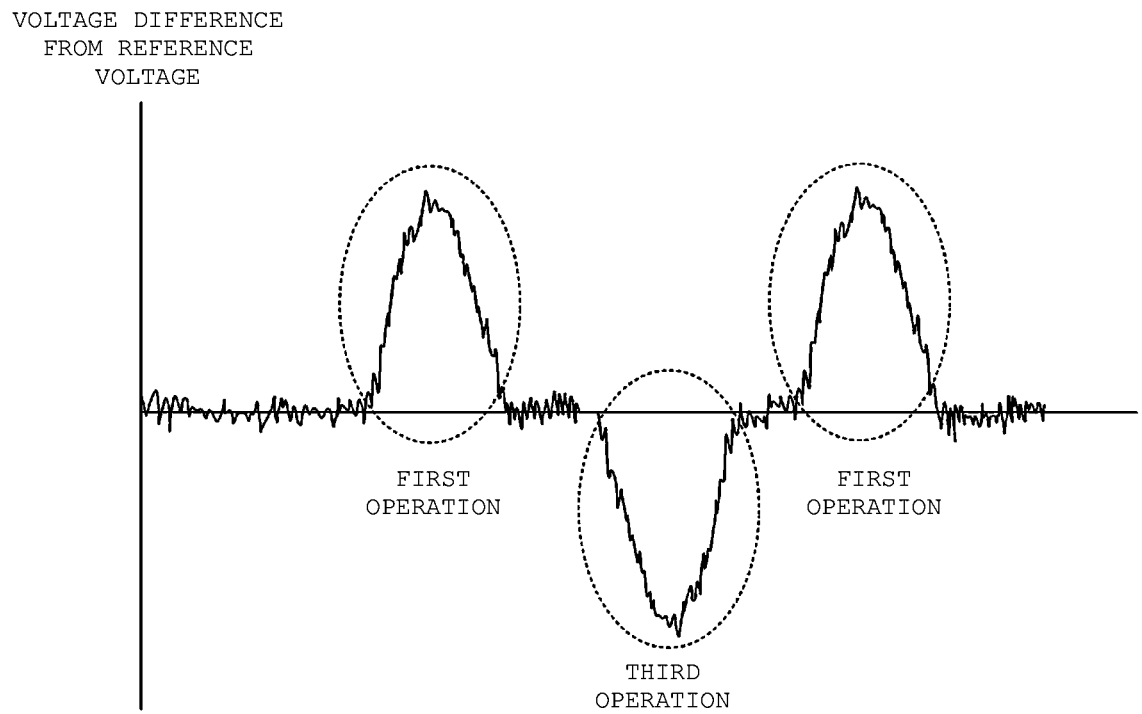

FIG. 12 is a flowchart illustrating an operation of the calculation unit 17 according to a fourth modification. FIGS. 13(A), 13(B), 14(A), and 14(B) are diagrams each illustrating a time waveform of a voltage difference between a detection voltage and a reference voltage according to the fourth modification. In FIG. 12, the same operations as those in FIG. 8 are denoted by the same reference numerals, and the description thereof will be omitted. When the calculation unit 17 of the fourth modification determines that the positive signal determination count has reached a predetermined time (e.g., 30 msec in this example) in S36, the calculation unit 17 further determines whether or not a two-consecutive pressing operation (e.g., a fifth operation) has been performed (S306). As illustrated in FIG. 13(A), the fact that the two-consecutive pressing operation is continuously performed refers to a state in which the output (e.g., the third operation) due to the release of the pressing is not detected after the output (e.g., the first operation) due to the pressing is detected, and the positive signal determination count has reached the predetermined time again. In this case, the calculation unit 17 determines that a pressing operation has been continuously performed twice in a short time as the fifth operation (S307). On the other hand, as illustrated in FIG. 13(B), when the positive signal determination count reaches the predetermined time after detecting the output (e.g., the third operation) due to release of the pressing, the calculation unit 17 determines that the normal pressing operation (e.g., the first operation) has been performed (S37).

Figure 14A:
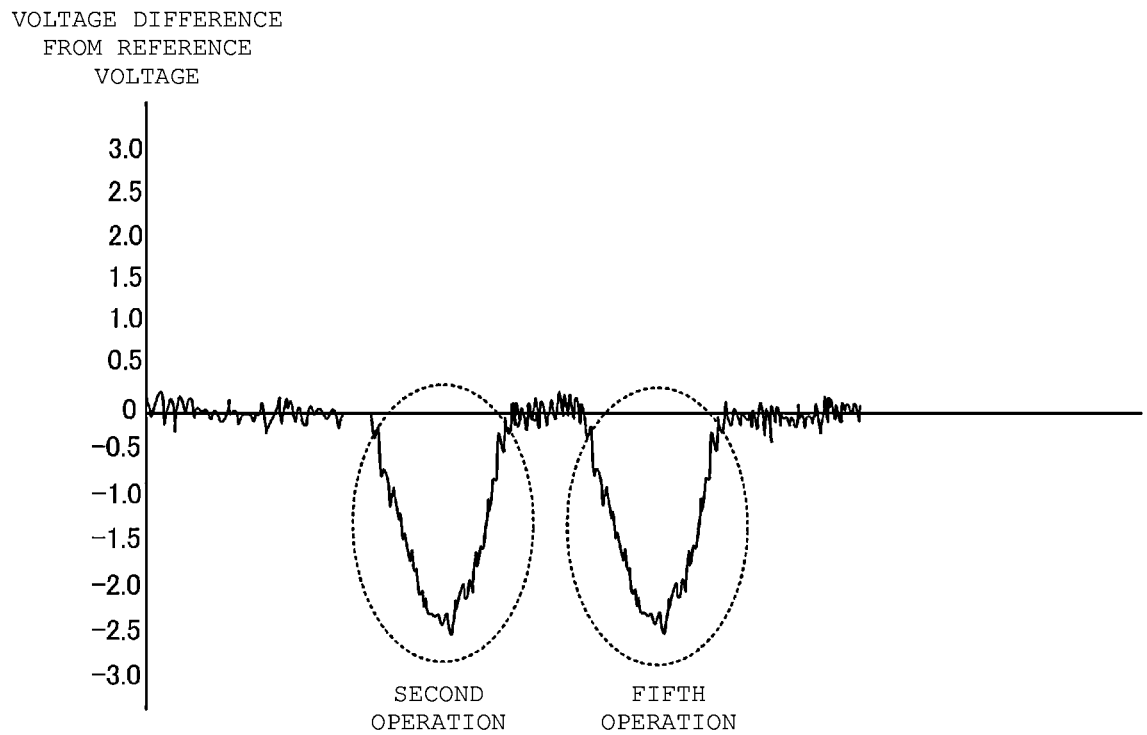
FIGS. 14(A) and 14(B) are diagrams each illustrating a time waveform of a voltage difference between a detection voltage and a reference voltage according to the fourth modification.
Figure 14B:
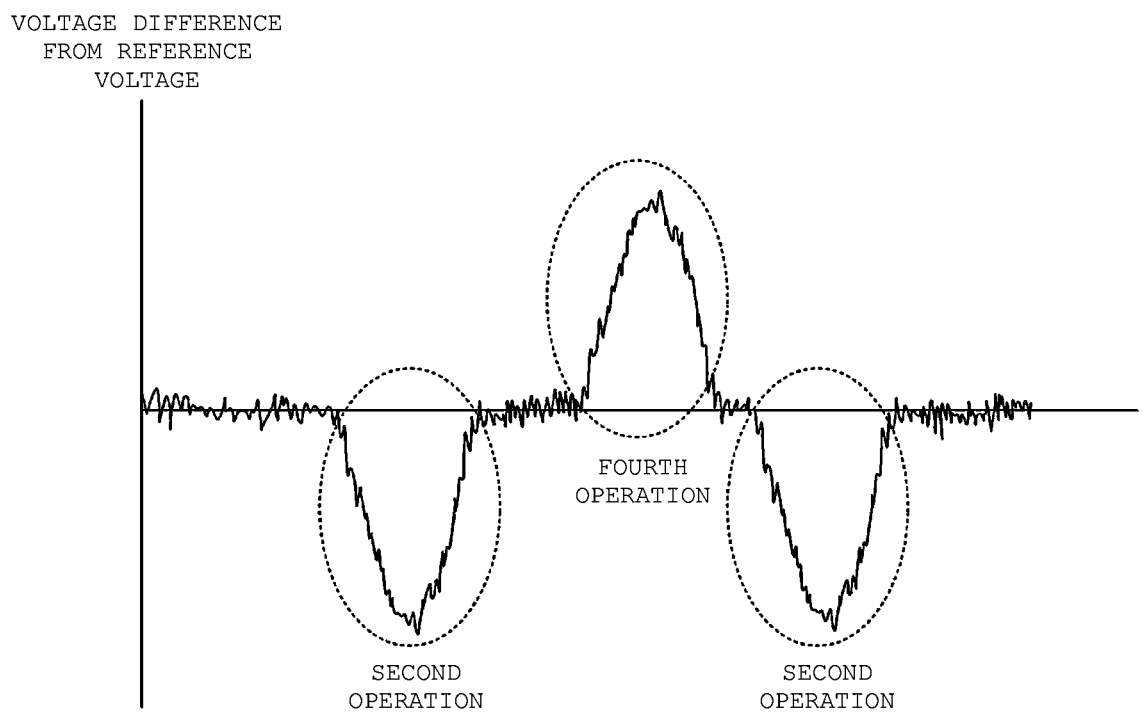

As illustrated in FIG. 14(A), the calculation unit 17 can be configured to invert the polarity, not detect the fourth operation after detecting the second operation, and then determine that the two-step operation is performed as the fifth operation when the negative signal determination count reaches the predetermined time again. In this case, as illustrated in FIG. 14(B), the calculation unit 17 detects the fourth operation, and then, determines that the normal pressing operation (e.g., the second operation) has been performed when the negative signal determination count reaches the predetermined time.

By the above processing, the calculation unit 17 can distinguish between the simple pressing operation and the two-step pressing operation. For example, the calculation unit 17 can start different application programs depending on whether a simple pressing operation is determined or a two-step pressing operation is determined.

It is noted that the calculation unit 17 can be configured to determine a greater number of pressing operations (for example, a sixth operation which is a three-step consecutive pressing operation).

Figure 15:
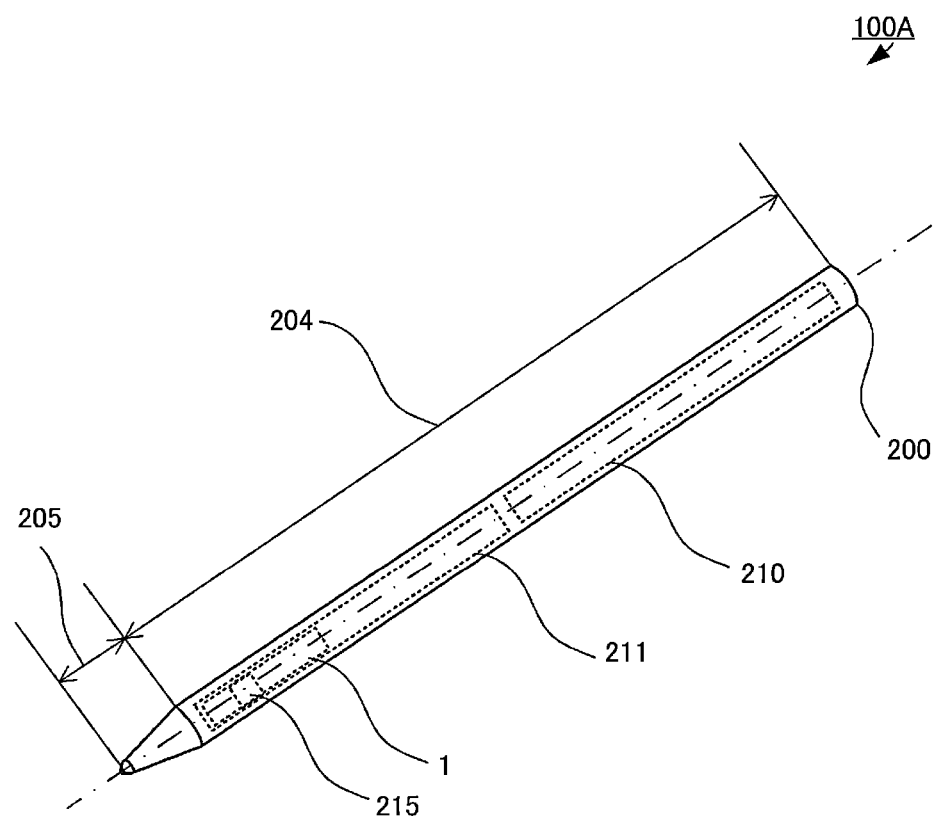
FIG. 15 is an external perspective view (partially transparent perspective view) of a stylus pen 100A as another example of an electronic apparatus.

Next, FIG. 15 is an external perspective view (partially transparent perspective view) of a stylus pen 100A as another example of the electronic apparatus.

The stylus pen 100A is held by a user. The user holds the stylus pen 100A and performs a writing operation to trace a touch panel display of a host electronic apparatus such as a smartphone or a tablet PC. The host electronic apparatus detects a touch position of the stylus pen 100A and performs predetermined processing.

The stylus pen 100A includes a housing 200 including a rod-shaped portion 204 and a distal end portion 205 connected to the rod-shaped portion 204. In FIG. 15, the bottom surface shape of the rod-shaped portion 204 is circular, but may be polygonal in alternative aspects. In use, the stylus pen 100A receives a gripping operation from the user at a position close to the distal end portion 205 of the rod-shaped portion 204. The stylus pen 100A then notifies a host electronic apparatus, such as a smartphone or a tablet PC, when a two-step consecutive gripping operation has been received. Upon receiving the notification, the host electronic apparatus activates, for example, a predetermined application program.

The rod-shaped portion 204 is hollow in the exemplary aspect. The rod-shaped portion 204 includes a battery 210 and a control board 211 therein. The control board 211 includes the operation detection sensor 1 and an acceleration sensor 215. The control board 211 is arranged at a position closer to the distal end portion 205 than the battery 210. The operation detection sensor 1 is arranged on a side of the control board 211 close to the distal end portion 205. The operation detection sensor 1 is arranged at a position where the user grips the stylus pen 100A. The operation detection sensor 1 can also be attached to the inside of the rod-shaped portion 204, or can be attached to a side closer to the distal end portion 205 inside the rod-shaped portion 204.

The acceleration sensor 215 is, for example, a three-axis acceleration sensor having three detection axes. One of the three detection axes of the acceleration sensor 215 is parallel to the axis (hereinafter, the axis is referred to as a parallel axis) of the rod-shaped portion 204 indicated by a broken line in FIG. 14. In this example, the acceleration sensor 215 is also arranged on the side of the control board 211 close to the distal end portion 205. Accordingly, the acceleration sensor 215 can easily detect an impact at the distal end portion 205.

Figure 16:
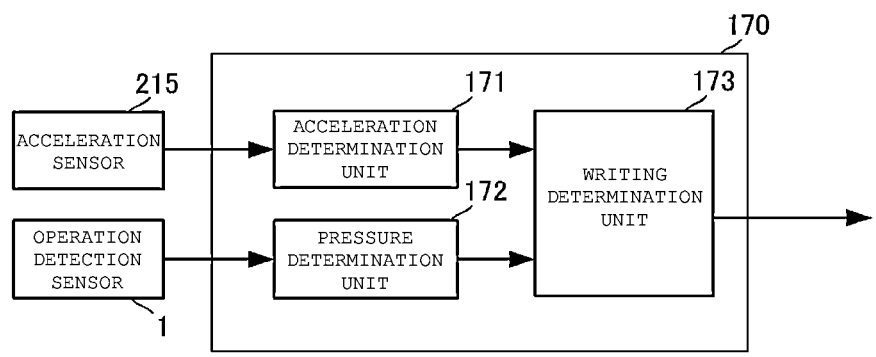
FIG. 16 is a block diagram showing a configuration of a stylus pen 100A.

FIG. 16 is a block diagram showing a configuration of the stylus pen 100A. The stylus pen 100A includes a microcomputer 170. The microcomputer 170 functionally includes an acceleration determination unit 171, a pressure determination unit 172, and a writing determination unit 173. In an exemplary aspect, the microcomputer 170 can be configured to execute software stored on electronic memory to implement each of the acceleration determination unit 171, the pressure determination unit 172, and the writing determination unit 173 to perform the algorithms described herein. In particular, the acceleration determination unit 171 receives a signal from the acceleration sensor 215 and determines the acceleration applied to the stylus pen 100A. The pressure determination unit 172 receives a signal from the operation detection sensor 1 and determines whether or not a pressing operation has been performed on the stylus pen 100A.

When a user performs the writing operation while holding the stylus pen 100A, acceleration is generated in the parallel axis by the impact of the writing operation. The acceleration determination unit 171 determines whether or not there is a change continuing for a predetermined time or more in the acceleration of the parallel axis and the writing operation is performed, for example, on the basis of the flowchart illustrated in FIG. 4 or FIG. 6. However, the predetermined time in which the determination count satisfies the condition is shorter than the time illustrated in FIG. 4 or 6, and is preferably 10 msec or less, for example. The change in the acceleration of the parallel axis generated at the time of the writing operation is about 10 to 20 msec. Therefore, if the predetermined time is set to 10 msec or less, the acceleration determination unit 171 can accurately determine the change in the acceleration of the parallel axis generated at the time of the writing operation.

It is also noted that it is no required that one of the three axes of the acceleration sensor 215 is parallel to the parallel axis, but since the correlation between the output of the parallel axis and the impact applied to the distal end portion 205 is high, the acceleration determination unit 171 can determine the impact at the time of the writing operation with high accuracy without performing complex signal processing.

Moreover, the pressure determination unit 172 determines the gripping operation based on, for example, the flowchart illustrated in FIG. 12. The pressure determination unit 172 determines one pressing operation (e.g., a first operation or second operation) as the start of the gripping operation. The pressure determination unit 172 determines the two consecutive steps of pressing operation (e.g., a fifth operation) as the occurrence of the gripping operation.

Figure 17:
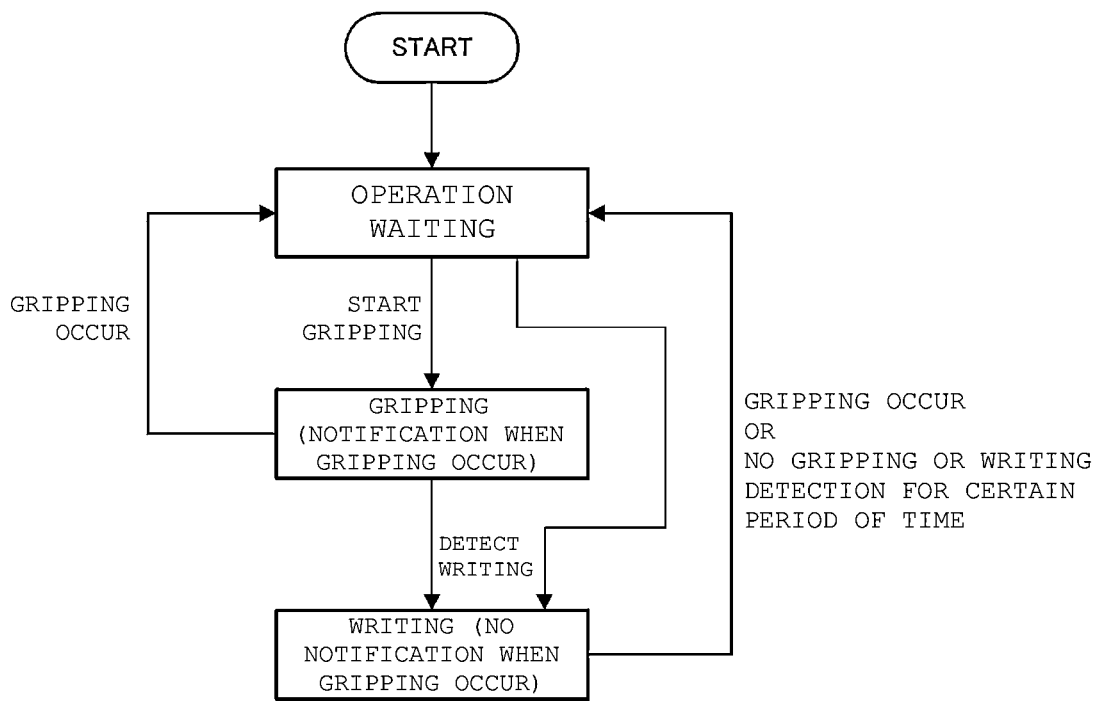
FIG. 17 is a state transition diagram of a writing determination unit 173.

FIG. 17 is a state transition diagram of the writing determination unit 173. The writing determination unit 173 determines three states of "operation waiting", "gripping", and "writing" on the basis of the determination results of the acceleration determination unit 171 and the pressure determination unit 172. The writing determination unit 173 shifts to the "operation waiting" state when the stylus pen 100A is activated. When the pressure determination unit 172 determines that the gripping operation has been started in the "operation waiting" state, the writing determination unit 173 shifts to the "gripping" state. Furthermore, when the pressure determination unit 172 determines that the gripping operation has occurred in the "gripping" (that is, in a case where the two consecutive steps of pressing operation is detected), the writing determination unit 173 notifies the host electronic apparatus and returns to the "operation waiting" state. Note that the writing determination unit 173 can be configured to perform different notifications according to the number of occurrences of the gripping operation. The host electronic apparatus can perform different processing according to the number of occurrences of the gripping operation.

In a case where the acceleration determination unit 171 determines the writing operation during the "operation waiting" or the "gripping", the writing determination unit 173 shifts to the "writing" state. In the state of "writing", the writing determination unit 173 does not notify the host electronic apparatus if the pressure determination unit 172 determines the occurrence of the gripping operation.

When the gripping operation has not occurred for a certain period of time or more and the writing operation is not determined, the writing determination unit 173 shifts to the "operation waiting" state.

Figure 18:
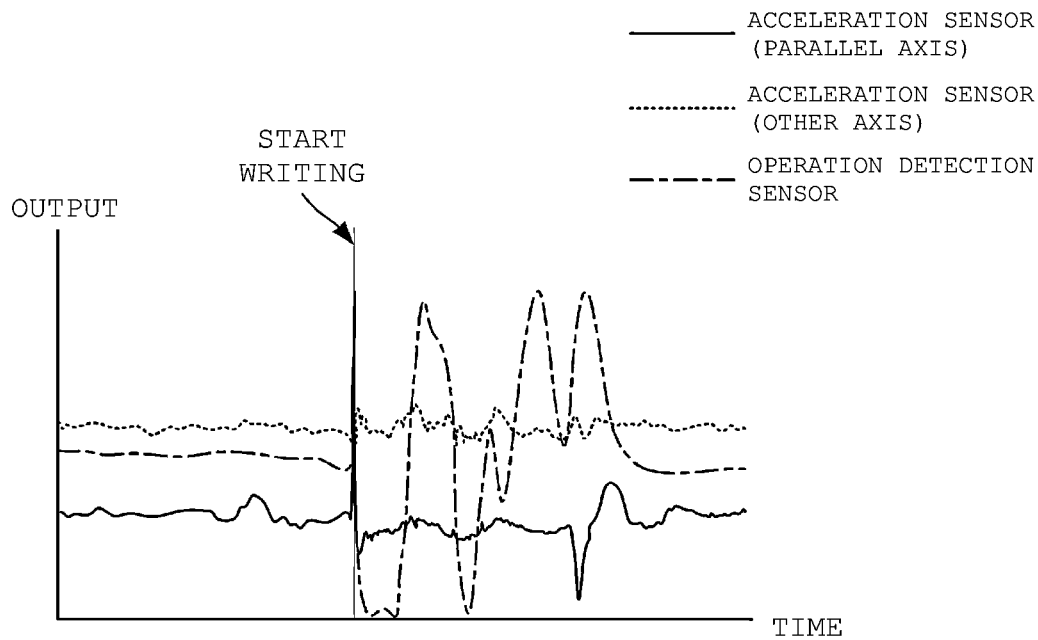
FIG. 18 is a diagram illustrating a temporal change of an output of each sensor.

FIG. 18 is a diagram illustrating temporal changes in the output of each sensor. FIG. 18 illustrates, as an example, an output waveform of each sensor when the number "3" is written. The horizontal axis of the graph illustrated in FIG. 18 is time, and the vertical axis corresponds to the output (e.g., voltage).

As illustrated in FIG. 18, in the acceleration sensor 215, an output in the direction parallel to the parallel axis is a signal at a much greater level than an output in other directions at the start of writing. Furthermore, as described above, the change in the acceleration of the parallel axis generated at the time of the writing operation is a short time of about 10 to 20 msec. Since the predetermined time in which the determination count satisfies the condition is set to 10 msec or less, the acceleration determination unit 171 can accurately determine such a change in acceleration in a short time as the start of the writing operation.

Furthermore, as described above, in the state of "writing", the writing determination unit 173 does not notify the host electronic apparatus of the occurrence of the gripping operation if the pressure determination unit 172 determines the occurrence of the gripping operation. As illustrated in FIG. 18, during writing, an output corresponding to a change in grip force at the time of writing is generated from the operation detection sensor 1. That is, during writing, a state greater or lower than the reference voltage may occur for a predetermined time (e.g., for example, 30 msec) or more due to the writing pressure or the like. However, the writing determination unit 173 does not erroneously determine the output due to such writing pressure as the gripping operation.

It is also noted that the writing determination unit 173 can be configured to immediately shift to the "operation waiting" state after the pressure determination unit 172 determines the occurrence of the gripping operation. In this case, the writing determination unit 173 can immediately accept the start of the gripping operation after the end of the writing operation, and can immediately detect the next gripping operation after the end of the writing operation.

DESCRIPTION OF REFERENCE SYMBOLS

1: Operation detection sensor
10: Piezoelectric element
11: First electrode
12: Second electrode
15: Voltage detection circuit
17: Calculation unit
100: Electronic apparatus
102: Housing
103: Surface panel
104: Display

The invention claimed is:

1. An operation detection sensor comprising:
a piezoelectric element;
a voltage detection circuit configured to detect a detection voltage generated in the piezoelectric element; and
a calculation unit configured to:
obtain a reference voltage by averaging a plurality of values of the detection voltage detected by the voltage detection circuit,
reset a determination count of a negative signal corresponding to the detection voltage when a voltage difference between the reference voltage and the detection voltage is greater than a predetermined value,
detect an operation on an operation target when the voltage difference between the reference voltage and the detection voltage is greater than the predetermined value and a determination count of a positive signal corresponding to the detection voltage reaches a predetermined time,
reset the determination count of the positive signal when the voltage difference between the reference voltage and the detection voltage is less than the predetermined value,
count up the determination count of the negative signal after the determination count of the positive signal has been reset, and
determine an operation off of the operation target when the determination count of the negative signal reaches the predetermined time.

2. The operation detection sensor according to claim 1, wherein the calculation unit is further configured to detect a deformation operation on the operation target when the voltage difference between the reference voltage and the detection voltage is greater than 0 and continues for at least the predetermined time.

3. The operation detection sensor according to claim 1, wherein the calculation unit is further configured to detect a first operation in a state where the reference voltage is greater than the detection voltage for at least the predetermined time.

4. The operation detection sensor according to claim 3, wherein the calculation unit is further configured to detect a second operation in a state where the reference voltage is lower than the detection voltage for at least the predetermined time while the first operation is not detected.

5. The operation detection sensor according to claim 3, wherein the calculation unit is further configured to detect a third operation in a state where the reference voltage is lower than the detection voltage for at least the predetermined time after detecting the first operation.

6. The operation detection sensor according to claim 4, wherein the calculation unit is further configured to detect a fourth operation in a state where the reference voltage is greater than the detection voltage for at least the predetermined time after detecting the second operation.

7. The operation detection sensor according to claim 1, wherein the calculation unit is configured to stop a next detection until a predetermined waiting time elapses after detecting the operation on the operation target.

8. The operation detection sensor according to claim 5, wherein the calculation unit is further configured to determine that a two-step operation has been performed in a state where the reference voltage is greater than the detection voltage for at least the predetermined time and in a state where the third operation is not detected after the first operation is detected.

9. The operation detection sensor according to claim 6, wherein the calculation unit is further configured to determine that a two-step operation has been performed in a state where the reference voltage is greater than the detection voltage for at least the predetermined time and in a state where the fourth operation is not detected after the second operation is detected.

10. An electronic apparatus comprising:
an operation detection sensor that includes a piezoelectric element;
a voltage detection circuit configured to detect a detection voltage generated in the piezoelectric element; and
a calculation unit configured to:
obtain a reference voltage by averaging a plurality of values of the detection voltage detected by the voltage detection circuit,
reset a determination count of a negative signal corresponding to the detection voltage when a voltage difference between the reference voltage and the detection voltage is greater than a predetermined value,
detect an operation on an operation target when the voltage difference between the reference voltage and the detection voltage is greater than the predetermined value and a determination count of a positive signal corresponding to the detection voltage reaches a predetermined time,
reset the determination count of the positive signal when the voltage difference between the reference voltage and the detection voltage is less than the predetermined value,
count up the determination count of the negative signal after the determination count of the positive signal has been reset, and
determine an operation off of the operation target when the determination count of the negative signal reaches the predetermined time.

11. The electronic apparatus according to claim 10, comprising:
a housing having a rod-shaped portion;
an acceleration sensor; and
a determination unit configured to determine the operation on the rod-shaped portion based on a voltage generated in the piezoelectric element.

12. The electronic apparatus according to claim 11, wherein the determination unit is further configured to detect a writing operation based on the acceleration sensor, and
wherein the determination unit is configured to notify, when an operation on the rod-shaped portion is detected except when the writing operation is detected, a host electronic apparatus connected to the electronic apparatus.

13. The electronic apparatus according to claim 12, wherein the determination unit is further configured to detect the writing operation when a change in an output of an axis parallel to the rod-shaped portion among detection axes of the acceleration sensor continues for at least the predetermined time.

14. The electronic apparatus according to claim 13, wherein the determination unit is further configured to detect the writing operation when the change in the output of the axis parallel to the rod-shaped portion among the detection axes continues for at least 10 msec.

15. The electronic apparatus according to claim 12, wherein the determination unit is further configured to notify the host electronic apparatus of a second operation on the rod-shaped portion when two or more operations on the rod-shaped portion are detected after detecting the writing operation.

16. A method for detecting an operation on an operation target, the method comprising:
detecting, by a voltage detection circuit, a detection voltage generated in a piezoelectric element;
obtaining, by a processor, a reference voltage by averaging a plurality of values of the detection voltage detected by the voltage detection circuit;
resetting, by the processor, a determination count of a negative signal corresponding to the detection voltage when a voltage difference between the reference voltage and the detection voltage is greater than a predetermined value;
determining, by the processor, the operation on the operation target when the voltage difference between the reference voltage and the detection voltage is greater than the predetermined value and a determination count of a positive signal corresponding to the detection voltage reaches a predetermined time;
resetting, by the processor, the determination count of the positive signal when the voltage difference between the reference voltage and the detection voltage is less than the predetermined value;
counting, by the processor, up the determination count of the negative signal after the determination count of the positive signal has been reset; and
determining, by the processor, an operation off of the operation target when the determination count of the negative signal reaches the predetermined time.

17. The method according to claim 16, further comprising determining, by the processor, a deformation operation on the operation target when the voltage difference between the reference voltage and the detection voltage is greater than 0 and continues for at least the predetermined time.

18. The method according to claim 16, further comprising determining, by the processor, a first operation in a state where the reference voltage is greater than the detection voltage for at least the predetermined time.

19. The method according to claim 18, further comprising determining, by the processor, a second operation in a state where the reference voltage is lower than the detection voltage for at least the predetermined time while the first operation is not detected.

20. The method according to claim 19, further comprising:
   determining, by the processor, a third operation in a state where the reference voltage is lower than the detection voltage for at least the predetermined time after detecting the first operation; and
   determining, by the processor, a fourth operation in a state where the reference voltage is greater than the detection voltage for at least the predetermined time after detecting the second operation.

21. An operation detection sensor comprising:
   a piezoelectric element;
   a voltage detection circuit configured to detect a detection voltage generated in the piezoelectric element; and
   a calculation unit configured to:
      obtain a reference voltage by averaging a plurality of values of the detection voltage detected by the voltage detection circuit,
      reset a determination count of a negative signal corresponding to the detection voltage when a voltage difference between the reference voltage and the detection voltage is greater than a predetermined value,
      detect an operation on an operation target when the voltage difference between the reference voltage and the detection voltage is at least the predetermined value and a determination count of a positive signal corresponding to the detection voltage reaches a predetermined time,
      reset the determination count of the positive signal when the voltage difference between the reference voltage and the detection voltage is less than the predetermined value,
      count up the determination count of the negative signal after the determination count of the positive signal has been reset, and
   wherein the calculation unit is further configured to detect an operation off of the operation target when the determination count of the negative signal reaches the predetermined time.

* * * * *